United States Patent [19]

Laing

[11] 4,073,284

[45] Feb. 14, 1978

[54] PROCESS AND DEVICE FOR UTILIZING METEOROLOGICAL RADIATIONS

[76] Inventor: Nikolaus Laing, Hofener Weg 35 bis 37, 7141 Aldingen near Stuttgart, Germany

[21] Appl. No.: 590,062

[22] Filed: June 25, 1975

Related U.S. Application Data

[63] Continuation of Ser. No. 370,830, June 18, 1973, abandoned.

[30] Foreign Application Priority Data

June 23, 1972 Austria .................................. 5406/72

[51] Int. Cl.² .............................................. F24J 3/02
[52] U.S. Cl. .................................. 126/271; 165/104 S; 165/105; 165/32; 62/467 FR; 165/49; 165/96; 126/400
[58] Field of Search ...................... 165/104 S, 105, 32; 60/524; 126/270, 271, 400

[56] References Cited

U.S. PATENT DOCUMENTS

| 2,396,338 | 3/1946 | Newton ......................... 165/104 S X |
| 2,917,817 | 12/1959 | Tabor ................................ 126/270 X |
| 3,390,672 | 7/1968 | Snelling ................................. 126/271 |
| 3,785,365 | 1/1974 | Laing et al. ........................... 165/105 |
| 3,799,144 | 3/1974 | Ramsey et al. ................... 165/105 X |

FOREIGN PATENT DOCUMENTS 2,050,198  5/1971  Germany .............................. 60/524

*Primary Examiner*—Albert W. Davis, Jr.
*Attorney, Agent, or Firm*—Pennie & Edmonds

[57] ABSTRACT

In a process or a device for receiving or emitting solar energy a coating absorbing or emitting the sunlight is in thermally conductive communication with a crystalline storage mass having a phase change at a predetermined temperature.

2 Claims, 17 Drawing Figures

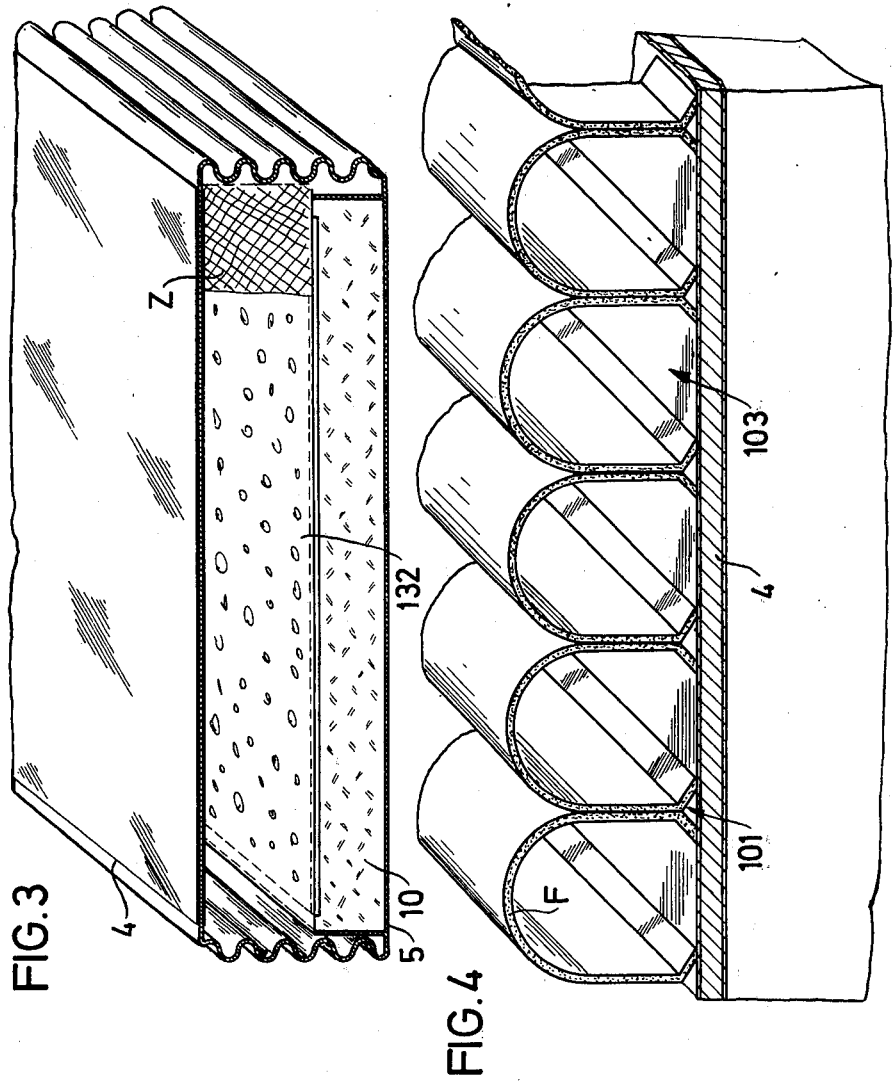

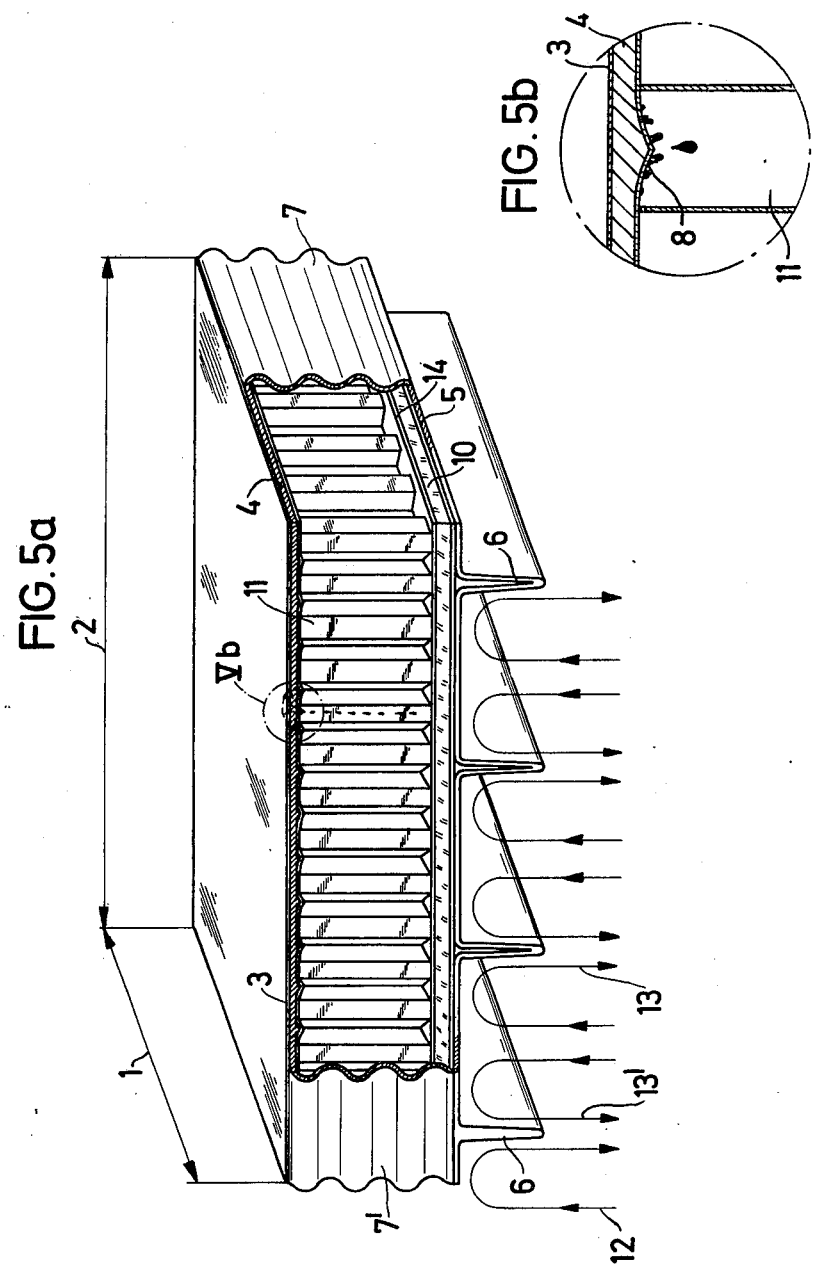

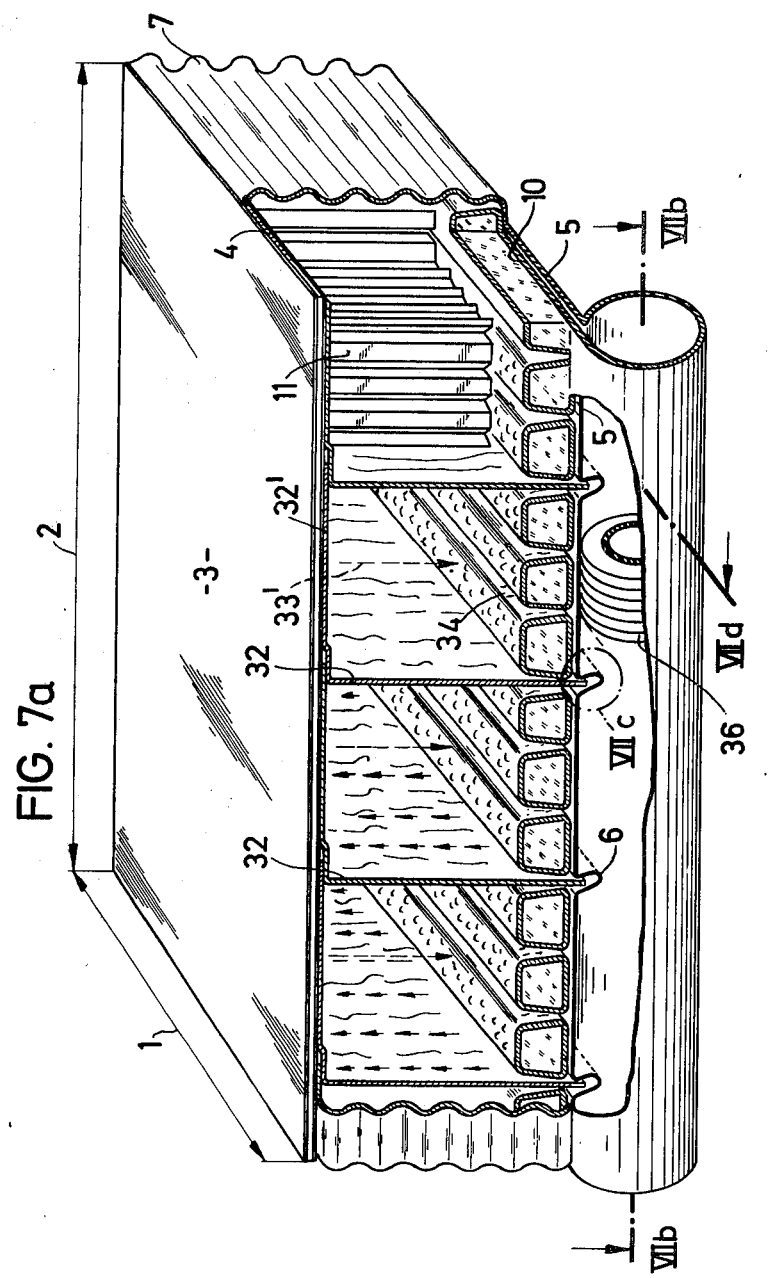

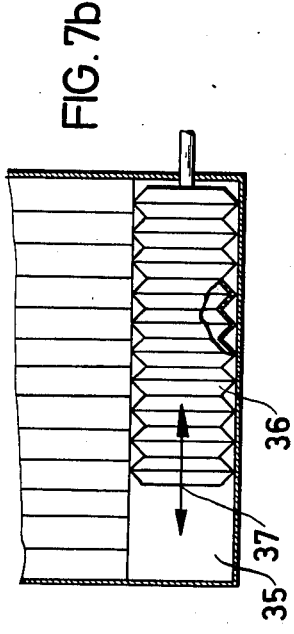
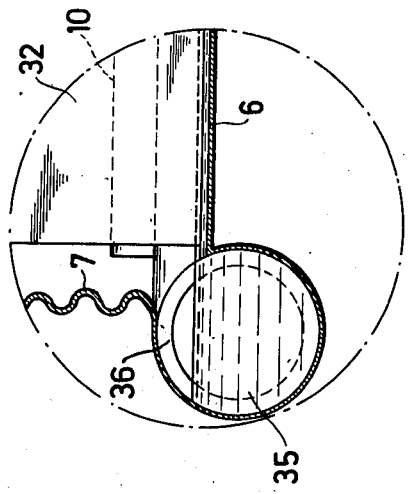
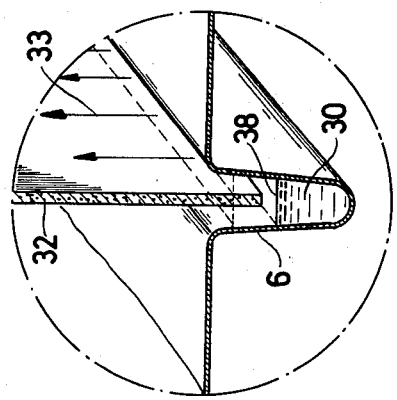

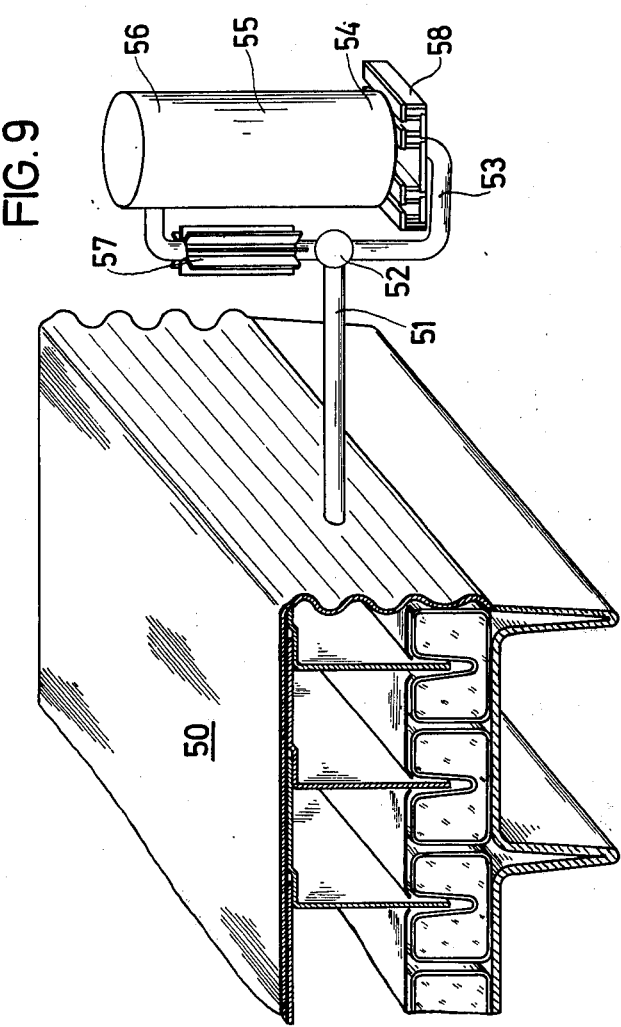

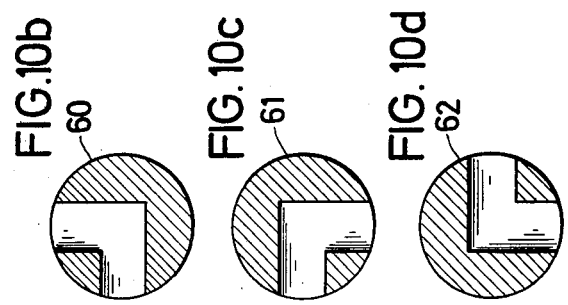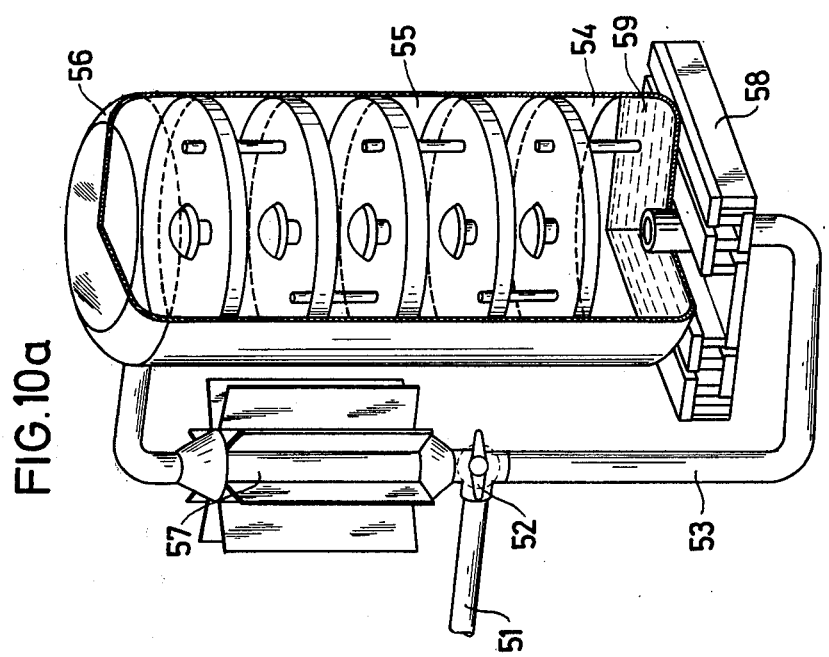

PROCESS AND DEVICE FOR UTILIZING METEOROLOGICAL RADIATIONS

CROSS REFERENCE TO OTHER APPLICATIONS

This application is a continuation of my copending application Ser. No. 370,830 filed June 18, 1973 now abandoned.

THE BACKGROUND OF THE INVENTION

Layers are known which strongly absorb sunlight and have low emissivity in the infrared region, as are layers which reflect sunlight and which emit in the infrared region. Such layers are on the one hand used in collectors of the sun's energy as so-called "super Black" layers or in devices rejecting the sun's energy as so-called "super white" layers.

It is known to use such layers for heating water for heating purposes. The heat which can be gained from the sunlight is given by the following equation:

$$N = S - R - I,$$

where N is the useful output, S the incident energy radiation/$m^2$ per second based on the solar constants, R the reflection/$m^2$ per second and I the reflection in the infrared region/$m^2$ per second.

The figure for R decreases as the absorption coefficient of the layer for the sunlight increases. The figure for I on the other hand, increases proportionally to the absorption coefficient in the infrared region and as $T^4$, where T is the absolute temperature.

From this it follows that water storage apparatus provided with a physically black surface layer, has a low efficiency, since although R is very small, I rapidly increases as the water temperature increases and reaches the value of S in the region of the boiling point of the water. At this temperature therefore the incident radiation and the longwave reflection are in equilibrium. In the case of water storage apparatus for domestic purposes the desired temperature is, as a rule, only 40 or 50°. At these low temperatures, however, only small quantities of energy can be stored for any given volume of the storage tank, since the storage capacity of the water increases proportionally to the temperature. This is the reason why where water is used as the heat storage medium, very poor efficiencies have to be expected.

THE OBJECT OF THE INVENTION

The object of the invention is to provide a process and a device for gaining heat by receiving the sun's energy and/or cooling spaces by emitting radiation in the infrared region of the spectrum, at which the heat absorption or radiation emission by the layer can take place at a considerably higher efficiency, which means that for any given size of surface area exposed to the sun considerably more energy can be gained or radiated away.

DESCRIPTION OF THE INVENTION

In order to achieve this object, the invention makes use of a storage material which stores energy not in the form of sensible heat, but in the form of latent heat.

In accordance with the invention, latent heat storage substances are accordingly use, whose temperature of crystallisation coincides with the desired process temperature, e.g. the temperature of the water in the case of water heaters. Thereby the temperature of the collector is considerably reduced and, in operation, maintained at a constant value which lies considerably below the hitherto conventional temperature. Thereby the figure for I is considerably smaller than when using known devices of this kind, which accounts for the higher efficiency.

The invention further envisages providing the sun collector with a layer which, over the frequency range of the sunlight, behaves substantially like a black body, i.e. which exhibits as high a degree of absorption as possible, whilst, to a large extent, it does not emit the longwave radiation. Such layers may, for example, be realised by providing, in a manner known per se, the collector surfaces with a number of layers, at least one of which has a thickness which has a predetermined relationship (e.g. ¼) to the mean wavelength of the sunlight. Thereby absorption of the sun's radiation results, whilst the infrared radiation, whose wavelength is greater by more than a factor of ten, is reflected. Since the radiation emitted decreases as the reflection increases, I in the above equation is thereby further reduced.

The inverse utilisation of meteorological radiations consists in the emission by radiation of energy in the infrared region for cooling purposes. In this case, according to the invention, the energy-S to be emitted by radiation is stored by latent heat storage devices, whose temperature of crystallisation coincides with the desired process temperature, e.g. the temperature of a ceiling of a room. Here the relationship is $$-S \sim \alpha \times \Delta (T^4)$$

where $\alpha$ is the emission coefficient and T the absolute temperature. From this equation it follows that any supercooling of the storage device leads to considerable reduction in the energy flow $-S$. By using the latent heat storage mass according to the invention supercooling in the course of operation no longer takes place, so that the optimum radiation emission conditions are present all the time. As a rule such arrangements will be used for the cooling of rooms. This means that the undesired heat radiated into the room during the day should be kept as low as possible. However, although physically black surfaces behave extremely favourably as regards radiation emission they behave extremely unfavourably for the purpose of heating by sunlight. For this reason, for the purpose of improving the effect, the invention envisages the use of layers having reflective properties which are as good as possible over the frequency range of the sunlight, whilst they emit well in the longwave region. For this purpose again, layers made up of a variety of materials are suitable, particularly metal mirrors, coated by a glass enamelled layer or also a plastics layer, provided that the material of the layer is highly absorptive in the longwave region. Thus clear glass enamelled coatings and also PTFE- layers have been found of advantage. Particularly suitable mirror materials are oxidefree aluminium surfaces.

The invention will be explained by way of example with reference to the figures.

FIG. 3 shows partly in perspective view and partly in section a device according to the invention in the form of a roof plate.

FIG. 4 shows partly in perspective view and partly in section a further embodiment of the invention.

FIG. 5a shows partly in perspective view and partly in section a roof plate for cooling, FIG. 5b shows a detail of the plate shown in FIG. 5a.

FIG. 7a shows partly in perspective view and partly in section an embodiment of the invention which is suitable for heating.

FIGS. 7b to 7d are fragmentary views showing details of the device shown in FIG. 7a.

FIG. 9 shows an embodiment of the invention partly in perspective view and partly in section in which the heat conduction may be varied.

FIG. 10a to 10d show details of the device shown in FIG. 9.

Figures 1, 2:
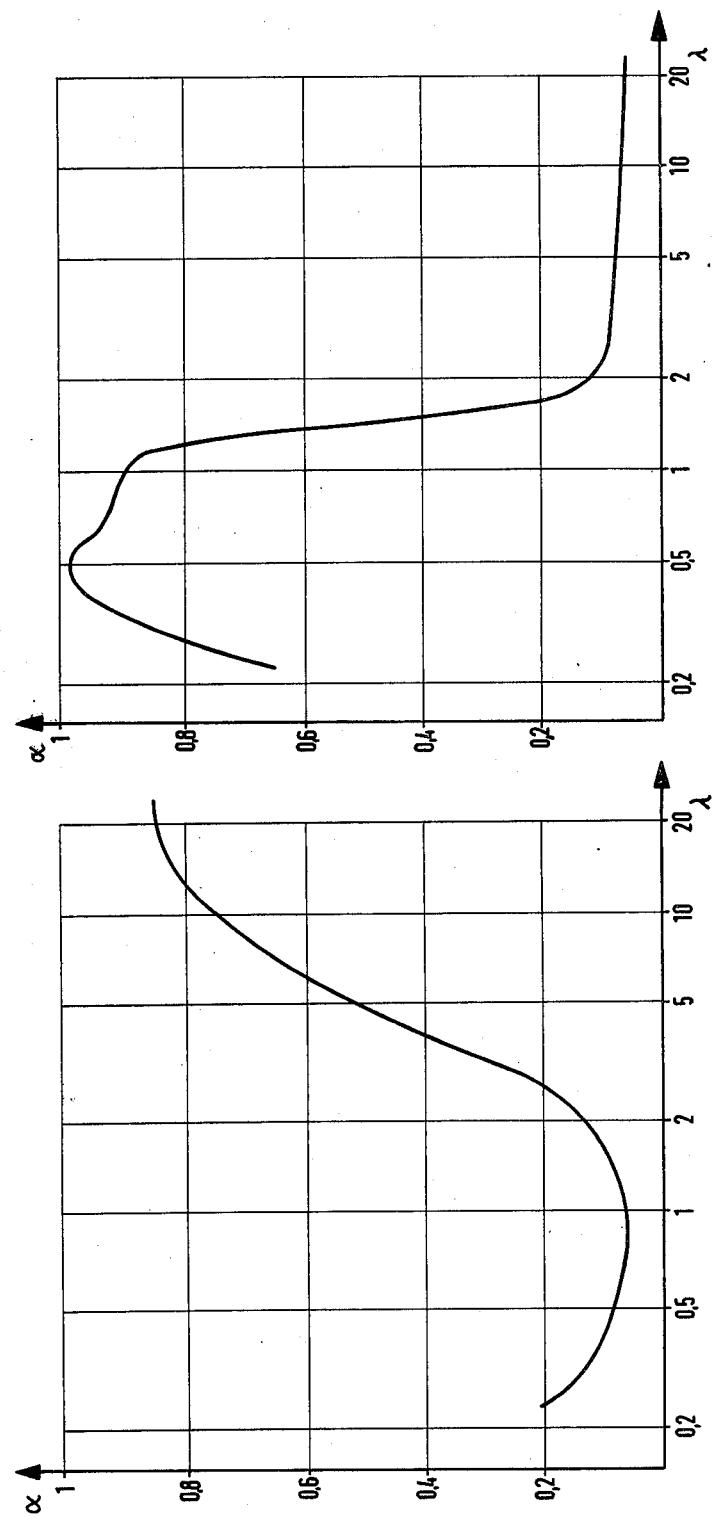
FIG. 1 shows a diagram of the absorption curve of a superwhite layer according to the invention.
FIG. 2 shows a diagram of the absorption curve of a superblack layer according to the invention.

FIG. 1 shows the spectral profile of a layer which consists of a layer which is opaque in the longwave region, but which is permeable to the sunlight, e.g. a special glass or sheet of fluorpolyethylene and a metal layer disposed thereunder, which reflects the sun's radiation to a large extent. FIG. 2 shows the spectral profile of a layer which comprises a magnesium fluoride layer, a very thin silicon dioxide layer, a silicon nitride layer and a gold layer.

FIG. 3 shows the principle of construction of a device constructed in the form of a roof plate, which consists of a wall 5 facing the interior, a storage mass 10 with a temperature of crystallisation of approximately 17° C, a heat insulating but gas permeable zone Z and an outwardly facing wall 4. The inside is filled with the saturated vapour of a heat carrier. The latter gives off heat to the outwardly facing wall 4, as soon as the latter is cooler than the heat storage mass 10 and whereby the wall 4 emits heat to free space. The layer 132 which has absorbing properties provides for the uniform distribution of the condensate.

FIG. 4 shows the outward facing layer of a wall which, for the purpose of preventing cooling by the convection current of the ambient air, is, in accordance with the invention, covered by the radiation permeable sheet F. The sheet is deformed to the profile shown and inseparably joined along the strips 101 to the optically active layer 102. The air enclosed in the ducts 103 acts as an insulator, so that no adverse effect is produced by the convection of ambient air.

FIG. 5a shows the principle of the construction of a device according to the invention in the form of a roof plate for the cooling of rooms. The length of the edge 1 is, for example, 5 to 10 meters, the length of the edge 2 is, for example, 1 to 2 meters. The cover plate 4 consists of metal and its surface 3 is directed to the ambient space. The downwardly directed plate 5 which is on the side of the room consists of metal and has ribs 6 which serve to improve the heat transfer. The joint between the two plates 4 and 5 consists of preferably corrugated edge strips 7 and 7' of poor thermal conductivity. For this purpose for example corrugated strips of thin sheet alloy steel are suitable. On the plate 5 a layer 10 of latent heat storage mass is disposed. The temperature of crystallisation of the storage mass is so chosen that it lies above the temperature of nightly radiation emission from the surface 3, and if possible above the dew point which prevails during the day inside the room. The temperature so chosen may be characterized as the working temperature inside the room. The support between the layer 10 and the plate 4 is provided by an anisotropic support structure 11, e.g. of vertically arranged parallel cavities of, for example, round or hexagonal cross-section (honeycomb structure). The interior of the plate is evacuated and thereafter partly recharged with a heat carrier medium. The properties of this heat carrier, which fills the interior of the plate in liquid and gaseous phase, are so chosen that the prevailing vapour pressure in the interior of the plate at the highest temperatures occurring during operation remains lower than the atmospheric pressure prevailing outside. The pressure inside the plate is determined by the coldest point of the appliance, i.e. not for example by the temperature of the plate 4 facing the sunlight. The inwardly facing side of the plate 4 has drip noses 8 (FIG. 5b), from which the condensate 9 of the heat carrier can drip. The drip noses 8 are so arranged that they all approximately coincide with the axis of the vertical support member 11.

As soon as the temperature on the room side has risen above the temperature of crystallisation of the storage mass, warm air rises in the direction of the arrows 12, gives off its heat to the ribs 6 and falls back into the room in the direction of the arrows 13 and 13'. The ribs 6 conduct the heat on into the storage mass 10. Thereby the storage mass 10 which initially is in its crystalline state, is continuously transformed into the molten state at constant temperature. Between the storage mass 10 and the support structure 11 a thin, e.g. sheet metal, cover plate 14 is located, on which the vaporisation of the heat carrier takes place.

The surface 3 is coated with a layer which emits radiation extremely well in the longwave infrared region, whilst it reflects well in the region of the sunlight. In this way the plate is does not acquire very high temperatures during the day, whilst it falls during the night to the radiation emission temperatures, which are considerably below the ambient temperature. As soon as the temperature of the plate 4 drops below the crystallisation temperature of the storage mass 10, condensation of the gaseous heat carrier begins in the interior of the plate 4, and the drips 9 fall back on to the plate 14 from the drip noses 8 inside the separate cavities of the support structure 11, and re-evaporate on the plate 14 so that a continuous evaporisation-condensation-cycle develops. As soon as radiation from the sun is again present and the temperature of the plate 4 exceeds the temperature of the storage device 10, this cycle ceases and the device acts as an effective insulator. The interior of the plate 4 is so treated that it reflects extremely well in the region of the infrared radiation.

Figure 6:
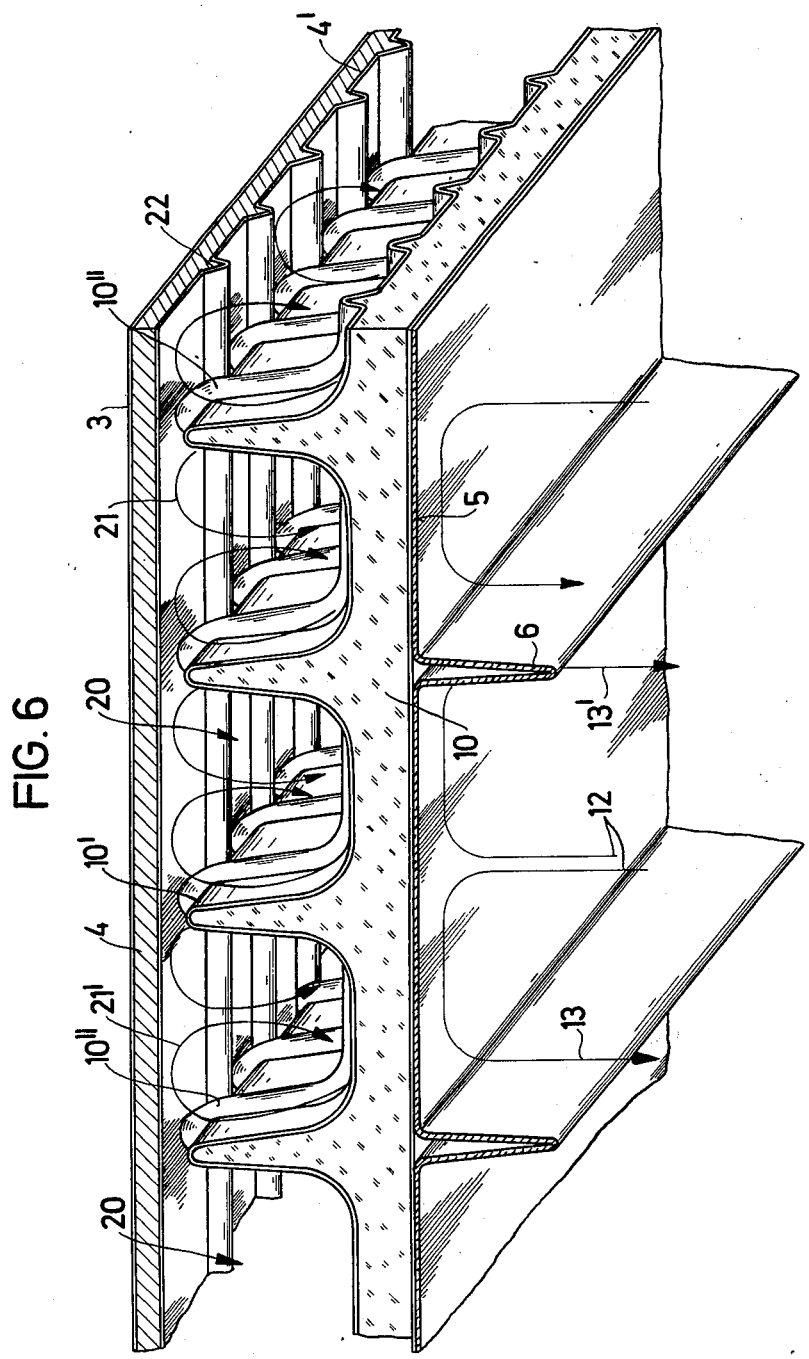
FIG. 6 shows an embodiment of the invention similar to that shown in FIG. 5a which is also provided for cooling the room located below it.

Whereas the device according to the invention and in accordance with FIG. 5a requires a vacuum-tight construction, i.e. makes necessary the corrugated edge strips 7 and 7', FIG. 6 shows an embodiment in which the heat transfer between the lower and upper side of the plate takes place not by means of gas or saturated vapour, but by air. The plate 5 with the ribs 6 which faces the room absorbs — as explained with reference to the previous figure — the heat from the convection current of the room air 12, 13, 13'. It transfers this heat to the storage mass 10, so that the latter is charged. The storage mass container has a cruciform rib arrangement 10' and 10" which is also filled with storage mass. So long as the storage mass is cooler than the outwardly facing plate 4, the air in the ducts 20 is at rest, since it is in the form of thermally stable layers. As soon as the temperature of the interior 4' of the plate 4 falls below the crystallisation temperature of the storage device 10 by reason of radiation emission from the surface 3, a convection current sets in in the ducts 20 in the direction of the arrows 21 and 21'. Thereby the heat is given off by the storage ribs 10' and 10'' to the plates 4, i.e. the storage device is discharged. The underside 4' of the plates has additional ribbing 22, whereby the heat transfer is increased by reason of the enlarged surface. These ribs extend at right-angles to the ribs 10' in the spaces between the ribs 10''. The surfaces 4' of the upper cover plate 4 which face into the interior of the plate, as well as the rib surfaces of the ribs 10' and 10'' of the storage mass container strongly reflect in the infrared region.

The advantage of this embodiment consists in that no pressure tight container is required.

Here also the outwardly facing layer 3 of the plate 4 has the optical properties described with reference to FIG. 5a.

FIGS. 7a to 7d show an embodiment of the type shown in FIG. 5, but for heating of rooms. The plate is also filled with a heat carrier 30. The dimensions of the edges 1 and 2 are also approximately the same as described with reference to FIG. 1.

The plate 5 facing the room is also provided with ribs 6. Here, however, the ribs have a further function; they are designed as ribs 6 for accommodating heat carrier condensate 30 (FIG. 7c). The storage bodies 10 are filled with a storage mass, which is capable of absorbing heat energy in the form of latent heat at a temperature lying above the desired room temperature. On the other hand the temperature of transformation of the storage device 10 should be so chosen that it still lies sufficiently below the operating or working temperature, which is assumed by the outwardly facing surface 3 of the upper cover plate 4 whilst radiation from the sun on to it takes place. This outwardly facing layer 3 is so constructed that it is extremely absorbing in the region of the sun's radiation, but is incapable of emitting in the region of the infrared radiation; it therefore preferentially absorbs heat energy in the region of the visible radiation, without emitting it again by re-radiation in the infrared region. The condensate of the heat carrier collects in the troughs 6. Regarding the choice of heat carrier, again the same consideration applies, that the temperature dependent maximum pressure which develops in the interior may never be higher than the external pressure. Strips 32 of suitable material active in its capillary effect extend into the troughs 6. In these strips, which are preferably made up of filamentary materials arranged parallel to the arrows 33, the condensate 30 is sucked upwards. These absorptive stripes 32 are angled off and over their region 32' extend parallel to the inwardly facing surface of the plate 4. From there they absorb heat during the day, whereby the condensate which is conveyed upwardly by capilliary forces evaporates and again moves downwardly in the direction of the arrows 33'. At the surface of the storage bodies 10 the vapour 34 condenses so long as it is hotter than the storage bodies. The storage bodies give off their heat to the room, i.e. they heat it especially by radiation. In order to prevent the plates from collapsing under the external pressure a support structure 11 is — as already described with reference to FIG. 5 — provided. The ducts 6 communicate with a manifold duct 35, in which an inflatable bellows member 36 is located. This bellows member is connected to a pump via a conduit and can be displaced in the direction of the arrow 37 by having a displacement medium applied to it. Thereby the amount of condensate in the trough 35 is made variable, so that the level of the condensate 38 can be so adjusted that alternatively the lower edge of the aborbent strip 32 dips into the condensate or not. Obviously any other displacement member may be substituted for the bellows member, by means of which the level of the condensate may be varied. This principle may also find application elsewhere, e.g. in the arrangement according to FIG. 8.

Figure 8:
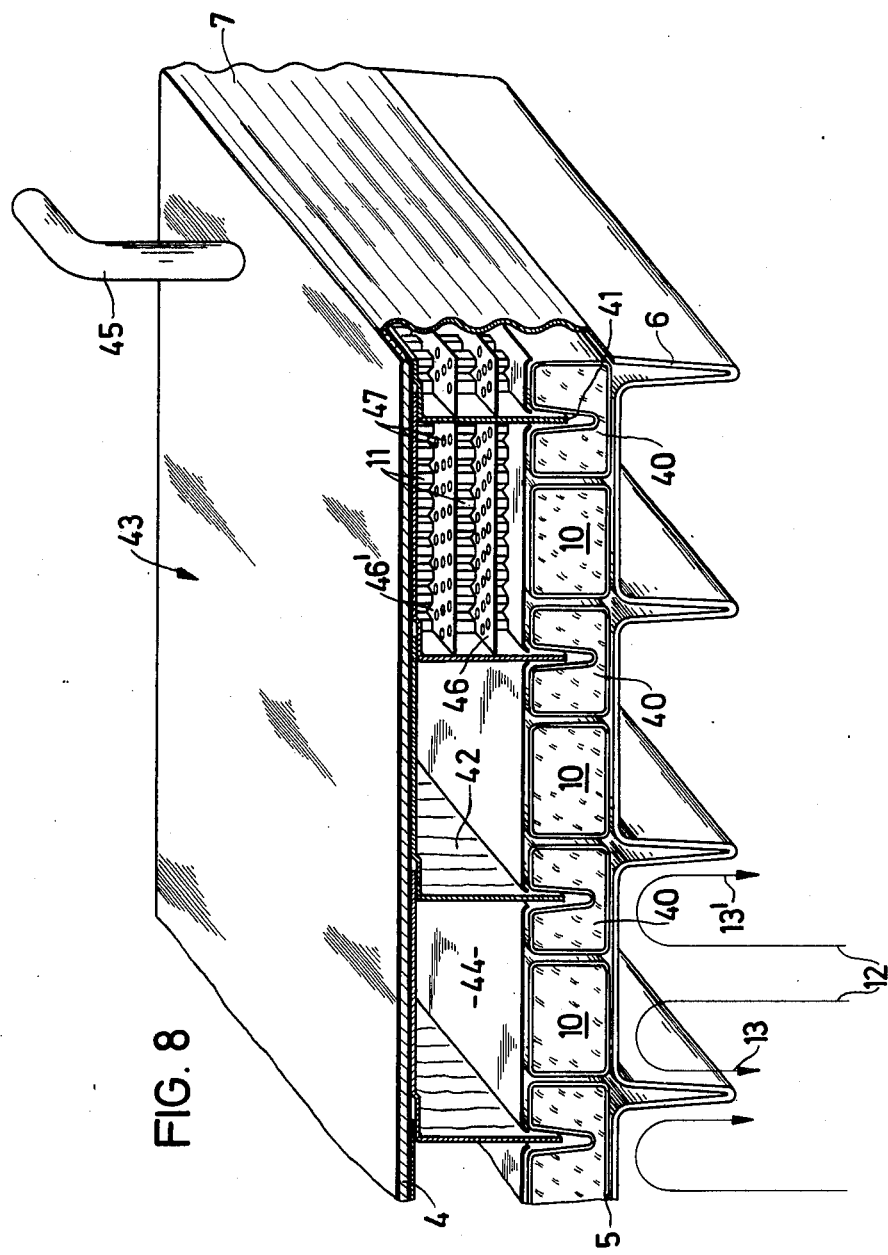
FIG. 8 shows in perspective view and in section an embodiment of the invention which is suitable for heating or cooling.

FIG. 8 shows an embodiment according to the invention, in which two kinds of storage body find application side by side. The storage bodies 10 provide cooling, whilst the storage bodies 40 provide heating of the interior of the room. The storage bodies 40 provided for heating again have troughs 41, into which — as has already been described with reference to FIGS. 7a to 7d — an aborbent strip 42 dips, which is angled off on the inside of the upwardly facing plate 4. If the temperature of the plate 4, the outwardly facing layer 43 of which absorbs in the visible as well as the longwave region, is heated during the day, the vapour reaches the surface 44 of the storage bodies, condenses there and gives off heat to the storage bodies 10 and 40. However only the storage bodies 40 are capable of absorbing latent heat, since they have an appropriately high transformation temperature. The storage devices 10 absorb the heat in sensible form. So long as the temperature of the plate 4 is higher than that of the storage body 40, this heat transfer takes place.

However, as soon as the outwardly facing layer 43 emits heat by radiation, the heat transfer is interrupted, in that a displacement body 36 described with reference to FIGS. 7a to 7b is reduced in size such that the entire quantity of liquid contained in the troughs 41 flows into the manifold duct 35 (FIG. 7d). In a different arrangement, the heat carrier is, in vapour form, conducted through a pipe conduit 45 to a condenser and precipitated in the latter, e.g. by cooling this condenser by means of Peltier elements. Inside the gas tight plate there are again located support members 11, between which reflective metal foils 46 and 46' are disposed. Each cavity of the support structure is associated with an aperture 47 in the foils 46 and 46', through which vapour and liquid can flow upwardly and downwardly. Inside the plate 4 the drip points described with reference to FIG. 5 (8) are attached, which cause condensate to drip back when heat is to be conveyed out of the storage elements 10 to the plate 4. In this case the storage bodies 10 remove the heat from the room air via the convention currents in the direction of the arrows 12, 13 and 13' — as in the embodiment according to FIG. 5 — and are changed. If during the night the layer 43 facing the ambient space is cooled to such an extent that its temperature falls below the temperature of the storage bodies 10, the continuous condensation-evaporation-cycle described with reference to FIG. 5 takes place. Sensible heat is withdrawn from the storage bodies 40, whilst the storage bodies 10 give off their latent heat.

Provision is made for using only as many heat carriers for filling the plate as are required for the pressure not to rise appreciably above the external pressure during heating operation, i.e. when heat is to be introduced from the surface 43 into the space below the roof plate.

Another variation of the invention provides that, depending on the operating manner for heating or cooling, two heat carriers of different boiling point are used. In this case a condensate is present for each medium. During heating the low boiling point medium remains in the associated condensation vessel, whilst it is the high boiling point medium during cooling.

It is also conceivable and provision is made to separate these heat carriers again from each other by means of separating devices, e.g. by rectifier columns, when they have become mixed.

FIG. 9 shows a roof plate with a rectifier column arranged outside the roof plate 50. In FIGS. 10a to 10d details of the rectifier column are shown. The latter is in communication with the interior of the roof plate via the pipe conduit 51. A change-over valve 52 connects the lower region 54 (sump) of the rectifier column 55 with the connecting pipe 51 via the pipe 53. The finned pipe 57 connects the head 56 of the column with the pipe 51.

If the plate is to be used for the purpose of insulation, the Peltier elements 58 are switched such that the sump 54 is cooled. Thereby the entire heat carrier mixture 59 migrates into the sump 54. The valve 52 is placed into the position 61. If it is intended to return the low boiling point component into the interior of the plate, the valve is correspondingly swung into the position 60 and by reversing the polarity of the Peltier elements 58 heat is applied to the sump 54 of the column 55. Via the head 56 of the column and the pipes 57 and 51 the low boiling point portion of the mixture enters the interior of the plate. If on the other hand the high boiling point portion is to be conducted into the plate, the valve is initially swung into the position 62. The column is heated by the Peltier elements 58. The low boiling point portion is condensed and collected in the finned pipe 57 by the removal of heat. By swinging the valve into the position 61 the high boiling point portion can be returned to the roof plate. In the position 62 the operationally filled roof plate and the column are relatively isolated.

The outwardly facing walls 4, 50, and 103 of the hollow plates are of large area and consist preferably of sheet metal on whose exterior surface the superblack or superwhite coating are applied. A thin aluminium layer is preferably provided on the surface of each of these walls facing the cavity.

The superwhite and superblack coatings may be vapour deposited in vacuums or precipitated from solutions and thereafter stoved. The following are examples of coatings which are black to the sunlight, whilst being reflective in the infrared region:

$Mo-Al_2O_3-Mo-Al_2O_3$
$Mo-Al_2O_3-Mo-Al_2O_3-Mo-Al_2O_3$
$Mo-Al_2O_3-Mo-Al_2O_3-Mo-Al_2O_3-Mo-Al_2O_3$
$Mo-CoO_2-Mo-MgF_2$
$Au-Si_3N_4-Si-SiO_2$
$Mo-Ta_2O_5$

Examples of superwhite coatings are:
ZnO — dispersed in an organopolysiloxane
$TiO_2$ — dispersed in an organopolysiloxane
Reflective layer coated with a polytetrafluorethylene film
Zi — dispersed in $K_2SiO_3$,
$Li_2O - Al_2O_3 - SiO_2$ — dispersed in $K_2Si_4O_9$ Examples of heat carriers in the hollow plates are:
$CH_3OH$
$H_2O$
$C_2H_5OH$ halogenated hydrocarbons Examples of storage masses are:
$MgCl_2.6H_2O$
$Al(NH_4)(SO_4)_2.12H_2O$
$NaC_2H_3O_2.3H_2O$
$NaC_2H_3O_2.5H_2O$ $LiNO_3.3H_2O$ Only a few examples of the coatings, the heat carriers and the storage masses are given above. Further examples are known, by means of which the desired effects can be achieved. As shown in the figures, the planar areas of the coating, storage mass and heat rectifying means of each of the devices illustrated are substantially equal with the parts overlying each other.

I claim:

1. A device for receiving and storing solar energy comprising a coating having a planar area adapted to strongly absorb solar energy where the coating possesses low emissivity in the infra-red region, a crystalline storage mass having a planar area substantially equal to the planar area of said coating and wherein said storage mass has a phase change point at a predetermined temperature equal to the desired working temperature to which the storage mass is to be exposed, said coating being situated above said storage mass, and an automatic vaporization and condensation heat rectifier means between said coating and said heat storage mass having a planar area substantially equal to the planar area of said coating and said storage mass and thermally connecting said coating and said storage mass for restricting flow of heat in one direction from said coating to said storage mass whereby heat absorbed by said coating is transferred to said storage mass where it may be subsequently released during a phase change and whereby a minimum of heat radiated back to said coating from said storage mass is emitted to free space.

2. A device according to claim 1 wherein said heat rectifier means comprises a closed chamber having a heat carrier therein in gaseous and condensate form and condensate transfer means to transfer said heat carrier in condensate form from said storage mass to said coating whereby when said heat carrier on said coating is heated by absorbed solar energy, it will vaporize and transfer heat from said coating to said crystalline mass where it is cooled and condensed and whereby when said coating is at a temperature below the vaporization temperature of said carrier, no heat will flow from said mass to said coating.

\* \* \* \* \*